United States Patent [19]
Corby, Jr. et al.

[11] Patent Number: 5,706,195
[45] Date of Patent: Jan. 6, 1998

[54] AUGMENTED REALITY MAINTENANCE SYSTEM FOR MULTIPLE ROVS

[75] Inventors: Nelson Raymond Corby, Jr.; Peter Michael Meenan, both of Scotia, N.Y.; Claude Homer Solanas, III, Morgan Hill; David Clark Vickerman, Pleasanton, both of Calif.; Christopher Allen Nafis, Rexford, N.Y.

[73] Assignee: General Electric Company, Schenectady, N.Y.

[21] Appl. No.: 523,420

[22] Filed: Sep. 5, 1995

[51] Int. Cl.⁶ ............................................. G06F 165/00
[52] U.S. Cl. ........................ 364/423.099; 364/423.098; 348/114
[58] Field of Search ............... 364/423.098, 423.099, 364/424.034, 551.01, 506, 507, 508, 432, 424.027, 424.028, 424.029; 348/113, 114, 130; 250/336.1; 367/6

[56] References Cited

U.S. PATENT DOCUMENTS

| | | |
|---|---|---|
| 4,581,762 | 4/1986 | Lapidus et al. ................... 348/130 |
| 4,706,120 | 11/1987 | Slaughter et al. ................. 348/114 |
| 4,742,227 | 5/1988 | Takenaka ....................... 250/336.1 |
| 4,818,990 | 4/1989 | Fernandes .................... 364/423.099 |
| 4,855,822 | 8/1989 | Narendra et al. ................. 348/114 |
| 5,047,990 | 9/1991 | Gafos et al. ......................... 367/6 |
| 5,155,683 | 10/1992 | Rahim ....................... 364/424.029 |
| 5,307,271 | 4/1994 | Everett, Jr. et al. ........... 364/424.028 |
| 5,412,569 | 5/1995 | Corby, Jr. et al. ................ 364/432 |
| 5,550,758 | 8/1996 | Corby, Jr. et al. ........... 364/424.027 |

*Primary Examiner*—Gary Chin
*Attorney, Agent, or Firm*—Lawrence P. Zale; Marvin Snyder

[57] ABSTRACT

An enhanced reality maintenance system operates one or more remotely operated vehicles (ROVs) in a hazardous or inaccessible environment. A computer model of the environment is created from spatial parameters provided to the system. Positions and orientations of moving objects are monitored. The projected course of the moving objects is extrapolated and constantly updated. An automated flight planner, receives desired destinations from an operator, analyzes the environment, the projected courses of moving objects and planned trajectories of other ROVs, and selects a planned trajectory of a selected ROV through the environment without collision.

3 Claims, 2 Drawing Sheets

AUGMENTED REALITY MAINTENANCE SYSTEM FOR MULTIPLE ROVS

CROSS-REFERENCE TO RELATED APPLICATIONS

Related to U.S. patent applications "Augmented Reality Maintenance System With Flight Planner" application Ser. No. 08/219,558, now U.S. Pat. No. 5,550,758, by Nelson R. Corby, Jr., Peter M. Meenan, Claude H. Solanas, David C. Vickerman; and "Augmented Reality Maintenance System Employing Robotics Arm" application Ser. No. 08/219,561, now abandoned, by Claude H. Solanas, Nelson R. Corby, Jr., Peter M. Meenan, David C. Vickerman, both incorporated by reference filed Mar. 29, 1994, and assigned to the present assignee.

BACKGROUND OF THE INVENTION

1. Field of the Invention

The present invention relates to a remotely operated vehicles and more specifically to computer enhanced environment visualization of a remotely operated vehicle.

2. Description of Related Art

Typically there is a need for inspection of machines or structures which are in environments which are inaccessible or very hazardous for humans. Several such environments would be inside a nuclear reactor boiler, deep beneath the sea, in a forest fire, in an oil well or in an area contaminated with a hazardous material. The high temperatures, radiation exposure, high pressure, or toxic effects of these environments are clearly dangerous for humans. The space requirements to examine an in-line pump within an oil well or other environments with limited space also preclude humans access.

Typically these machines and structures within these environments have been inspected or repaired by remotely operated vehicles (ROV). These ROVs may be attached to a control unit some distance away by a tether cord or may be run by radio signals from a control unit at a safe distance away. The ROVs typically have a method of sensing their environment, with a testing or imaging device, such as a video camera. ROVs also employ a means of propelling themselves around their environment. In a fluid, like water, it may be a number of propellers driven by electric motors.

The use of ROVs also typically require a method of determining the position and orientation of the ROV (and/or its subparts) with respect to the operating environment allowing it to successfully move the ROV through the inspection environment. An example of a position sensing system employs SONAR operating through the water of the nuclear reactor boiler. Conventional systems require complicated compensation schemes and frequent re-calibration to offset the errors due to variations or noise in the environment. For example, the time of flight of a SONAR signal depends on the temperature of the water through which the SONAR pulse travels. Temperature gradients within the pressure vessel must be carefully mapped and monitored to allow accurate position determination.

Typically the ROV will carry a number of inspection sensors. Typical sensors include underwater video cameras, ultrasound flaw detection transducers, thermal imagers and point probes, such as microphones.

The major problem in the use of ROVs for inspection and repair in these remote environments is the difficulty of accurately positioning the ROV at desired locations within a complicated environment and then verifying that position and orientation, and passing the position and orientation to persons analyzing data from the ROV or other support personnel.

Another problem occurs as the ROV is moved from one site to another manually within the environment. In this situation, it is difficult to accurately determine the ROV's position at a given instant. Since one of the sensors typically carried is an underwater video camera, the operator will often try to use the video from the camera to determine the exact position and orientation of the ROV, especially when the camera is not facing in the direction the ROV is moving. Typically the operator will zoom the camera back to wide angle and may move the ROV further away from a particular feature in an attempt to determine where in the environment he actually is. This task is made easier to the extent the position and orientation sensing (P&O) system is accurate and reliable. Often, the P&O systems are not very accurate and it may take a long time to accurately position the ROV for inspection or repair.

ROVs are typically used in determining cracks and fractures inside environments, such nuclear reactor boilers. Several problems arise using ROVs and nuclear reactor boilers. One problem is that irregularities need to be monitored over a period of time (on the order of years) to determine the rate of deterioration. Presently this is accomplished by moving an ROV to a particular position and videotaping the structure or device which is to be examined. At a later date the ROV is positioned at the same site and current data (such as a video image) is compared to previous data. Since it is very difficult to position the ROV at exactly the same site and orientation in three dimensions and obtain a video image from exactly the same viewpoint as previous times, it is difficult to determine differences in the between images. This tends to be a very subjective determination being made by the operator. The actual cost of maintenance of a nuclear power facility is not only related to the cost of inspection, but is also due to the time that the plant is off-line. This typically can be many times the actual cost of maintenance. It is therefore beneficial to complete inspection and repair in a minimum time period.

A related problem that affects the speed and accuracy of the inspection has to do with the difficulty of retrieving all pertinent past data. If an operator is re-inspecting a given location in the reactor, he needs all past information that relates to that site. This may consist of still imagery, segments of past videotapes of a site, auxiliary sensor data such as ultrasound and thermal images as well as non-image data such as written reports and observations or perhaps audio tape recordings of sounds at the site. If this background information is scattered over many physical locations and is recorded or stored on many types of media, (paper, photos, handwritten notes, audio tapes, magnetic video tapes or discs etc.) it becomes very difficult to rapidly make inspection decisions.

Another problem which arises in inspecting or examining structures with an ROV is that of planning the actual trajectory of the ROV needed to move it from one site to the next. The environment typically has objects which the ROV must avoid when traveling from one point to another. Currently, an operator examines environment blueprints, and with his knowledge of the ROV size and shape, maneuvers the ROV through the environment. It is very difficult to visualize the full complexity of the 3D environment and whether a given pathway actually will allow passage of the real ROV. Since control of the ROV is complex and demanding, it becomes a very difficult task for the operator to "size up" the suitability of a given approaching pathway while trying to physically control the progress of the ROV.

What may further complicate this situation is that there may be other moving objects in the environment, such as other ROVs not under the control of the operator. This may cause possible collisions.

Also, if more than one ROV is to be used cooperatively in performing a task, such as moving an object form one location to another, and "handing it off", the difficulty significantly increases.

Currently, there is a need for a system which can coordinate several ROVs to provide efficient remote inspection and repair in inaccessible or hazardous environments, such as moving nuclear fuel bundles to refuel a nuclear reactor.

SUMMARY OF THE INVENTION

A remote maintenance system employs an environment modeler for receiving parameters defining objects in a hazardous or inaccessible environment. The environment modeler produces a computer generated model of the environment.

At least one remotely operated vehicle (ROV) carries a sensor package for imaging and performing tests on structures in the environment, and actuators, capable of maneuvering the ROV in the environment.

A position and orientation (P&O) sensing unit senses the position and orientation of each ROV relative to the environment.

A pointing device is provided for the operator to select a trajectory, being a time-ordered sequence of locations to be visited by a selected ROV.

A course projection device within the flight planner receives input as to the location and orientation of moving objects in the environment. The course projection device extrapolates this course and indicates the occupied locations in a segmented time/space storage device.

A control unit sweeps any ROVs over their planned trajectory to determine locations occupied over time and stores this information in the time/location storage unit. The control unit then searches for a trajectory between points selected by the operator which do not intersect occupied locations. This planned trajectory is then passed to a path execution device which actuates the ROV along the planned trajectory.

Several ROVs may be activated in concert to perform coordinated activities, such as "handing off" objects. More than one system or automated flight planner may be employed with information passed between them to allow concerted flight planning.

OBJECTS OF THE INVENTION

It is an object of the present invention to provide a system for visualizing the position and orientation of several remotely operated vehicles within a specified environment.

It is another object of the present invention to provide a remotely operated vehicle (ROV) which automatically navigates through a hazardous environment crowded with objects and other ROVs.

BRIEF DESCRIPTION OF THE DRAWING

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE INVENTION

Figure 1:
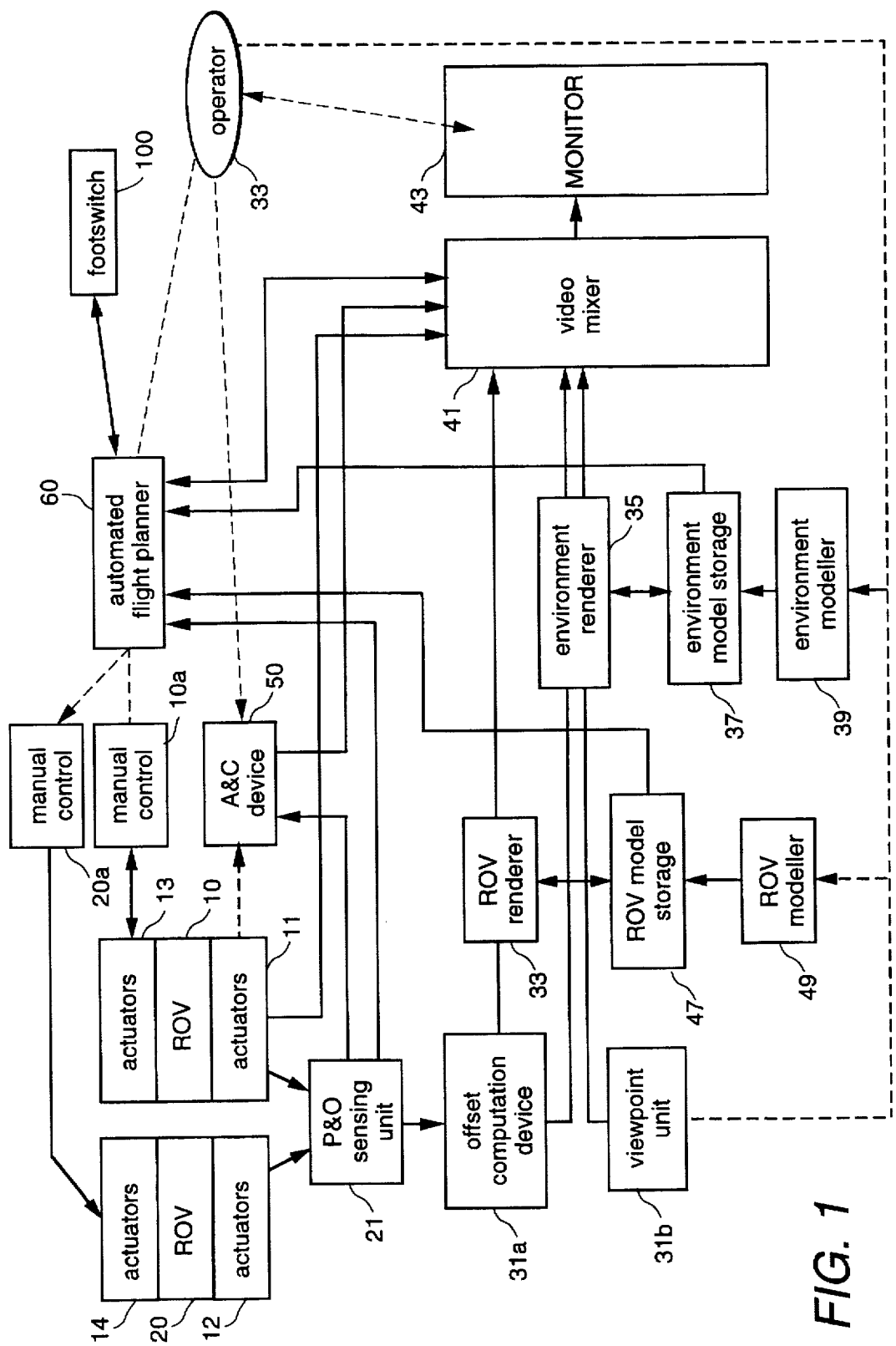
FIG. 1 is a simplified block diagram of an enhanced reality system according to the present invention.

FIG. 1 is a simplified block diagram of the major components of an augmented reality maintenance system according to the present invention.

Parameters defining an environment, such as blueprint measurements, position and shape measurements, and material types are provided to an environment modeler 39. These parameters may also be automatically provided by automated spatial measurement from ultrasound or laser distance. measurement devices. Environment modeler 39 constructs a computer model from the parameters it receives which may be rapidly manipulated in near-real-time. The model is stored in environment model storage device 37.

Parameters defining the geometry of several remotely operated vehicles (ROVs) are provided to an ROV modeler 49. ROV modeler 49 constructs a computer model from the parameters it receives. The models of the ROVs are stored in ROV model storage device 47.

An environment renderer 35 has the capability of accessing the model in environment model storage device 37, and displaying it as viewed from any location and orientation, known as an 'viewpoint'. It also has the capability of creating several displays of the model viewed from several different viewpoints simultaneously.

The ROVs 10, 20, attached by tether cord or a radio link to manual control units 10a, 20a of a base unit, are intended to be placed in a hazardous or inaccessible environment and employ a plurality of actuators 13, 14 which propel the ROVs through the medium of the environment. In a nuclear reactor boiler, filled with water, actuators 13, 14 are electric motors attached to propellers. These may move the ROV in a number of directions and rotate it in any orientation. In a terrestrial environment, actuators 13, 14 are motor driven wheels, tracks or belts.

A sensor package 11, 12 is attached to each ROV. This acquires information about desired structures or devices. The sensor package may include a spatial imaging device, which, in its most common form is a video camera. This acquires information such crack and corrosion in a wall of a nuclear reactor boiler, for example. Sensor package 11 may also be an ultrasound device capable of detecting irregularities in a structure or device, or any such modality used in structure examination. Sensor package 11 could also be a point measurement probe such as a microphone or accelerometer to measure vibrations. Also, more that one sensor could be operating at any time.

A position and orientation sensing (P&O) unit 21 determines an approximate location and orientation of each of the ROVs. This may be, for example, SONAR sound sources, dispersed at known locations around the environment which successively emit a signal. Multiple sensors on each ROV at known locations sense the signal from the SONAR sources. P&O sensing unit 21 determines the location (x,y,z) and orientation ($\alpha,\beta,\gamma$) of each ROV based upon differences in the time of reception of the signal by each sensor.

The positions (x,y,z) and orientations ($\alpha,\beta,\gamma$) determined by P&O sensing unit 21 for each ROV is provided to an ROV renderer 33. ROV renderer 33 creates an image of a prestored model of each ROV from model storage device 47, at its measured location (x,y,z) and orientation (α,β,γ) as viewed from an viewpoint provided to it. ROV renderer 33 has the capability of creating several images of the ROVs viewed from several different viewpoints simultaneously.

The position and orientation of each ROV, produced by P&O sensing unit 21, are supplied to offset computation device 31a. This device calculates a new viewpoint which is offset from a point of the ROV model. This is used to define viewpoints corresponding to the sensors which move with each ROV.

The environment renderer 35 produces a number of images of the environment corresponding to viewpoints supplied to it. In FIG. 1, two viewpoints are supplied—one from the viewing viewpoint unit 31b and another from the offset computation device 31a. The environment renderer 35 produces two image signals, one showing the environment viewed from a set viewpoint and a second showing the environment as seen from the viewpoint of the selected sensor traveling with a selected ROV.

Operator 2 determines the viewpoint from which to observe the operation of the ROVs activities. Operator 2 gives this viewpoint data to viewpoint unit 31b. The viewpoint provided to ROV renderer 33 and environment renderer 35 may be predetermined values which have been typed into, or are resident in, viewpoint unit 31b.

The images pertaining to the same viewpoint from ROV renderer 33 and viewpoints from environment renderer 35 are provided to a video mixer 41. In the embodiment shown in FIG. 1, two viewpoints are employed, with two images produced each with proper perspective by environment renderer 35, and by the ROV renderer 33. The ROV image and the environment image for a single viewpoint are provided to a video mixer, to superimpose the ROV image on the environment image resulting in a superimposed image showing the relative position of the ROV models in the simulated environment, which corresponds to the actual position of each ROV relative to the actual environment. Video mixer 41 receives images from environment renderer 35, the ROV renderer 33 and the sensor package 11 carried by the ROV 10. Video mixer 41 produces an image for monitor 43 for viewing by operator 2. The image produced on monitor 43 may consist of a number of sub-images comprising the main image. One such sub-image is the result of merging the image of the environment produced by the environment renderer 35 with the image of several ROVs produced by the ROV renderer 33. The viewpoint for both renderers is the same and is supplied by viewpoint unit 31b. The second sub-image may be a view of the environment as seen from the point of view of a sensor package 11 traveling with a selected ROV 10, 20. The third sub-image appearing on monitor 43 is an image produced by the sensor package 11 carried by ROV 10.

In alternative embodiments, more or fewer viewpoints, images may be used to create more or fewer superimposed images. Also, in another alternative embodiment, an operator may select or change the viewpoints and the offsets during operation.

The present invention further employs an automated flight planner 60 which is coupled to environment model storage device 37, ROV model storage device 47 and manual control units 10a, 20a which control actuators 13, 14. Manual control units may be overridden to allow direct control of actuators by operator 2.

Figure 2:
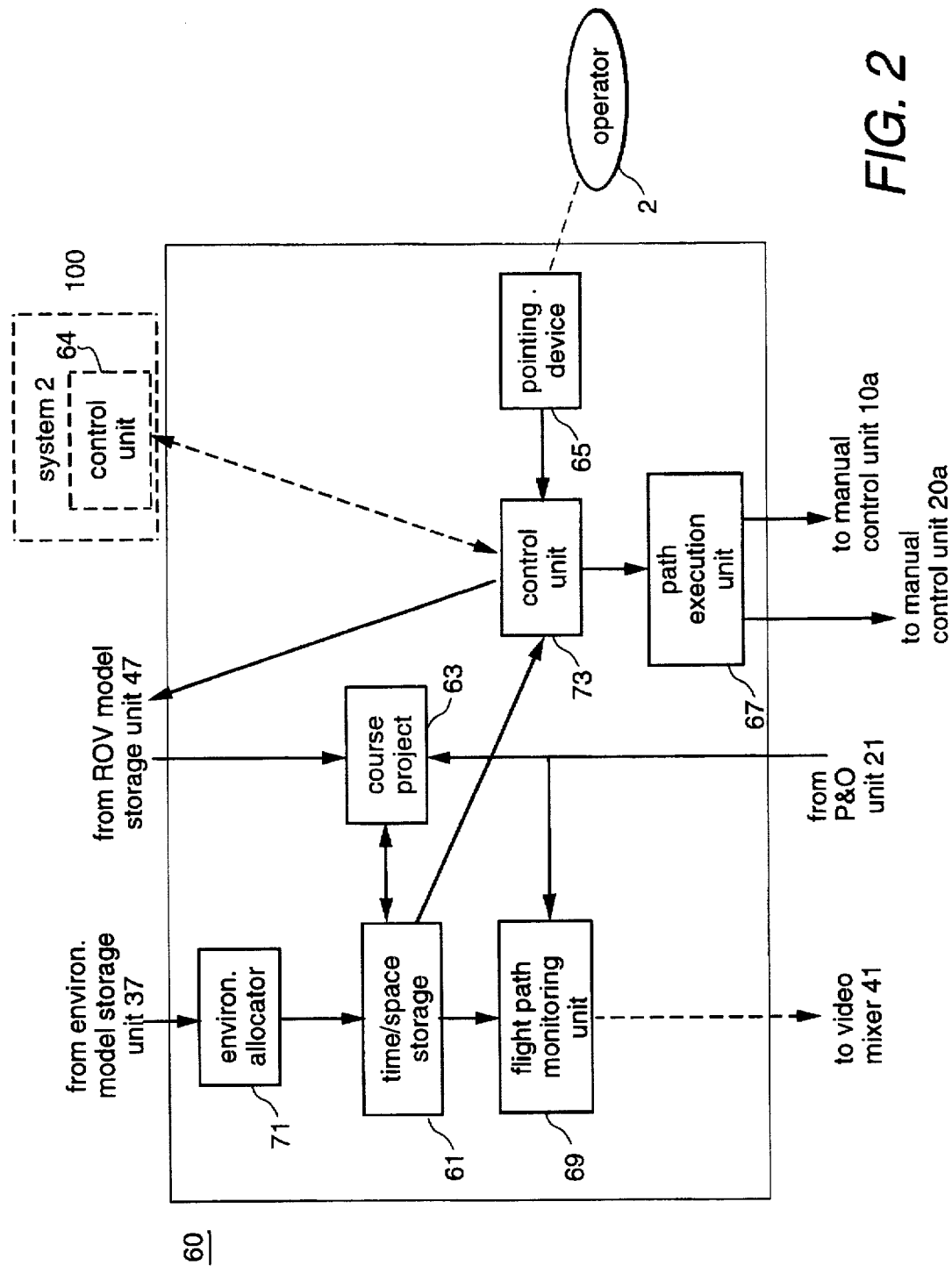
FIG. 2 is a more detailed block diagram of automated flight planner of FIG. 1.

FIG. 2 shows a more detailed block diagram of the automated flight planner 60 of FIG. 1. In FIG. 2 a time/space storage memory 61 is segmented into a plurality of time segments. Each time segment represents the 3D volume within the environment. An environment allocator 71 is coupled to the environment storage unit 37 and provides spatial information relating to the location of objects within the environment and indicates in time/space storage device 61 that for all time periods this volume is already filled.

A course projector device 63 receives input from P&O unit 21 indicating a location, orientation, and type of moving objects. The type may be determined by having each ROV emit a unique signal thereby identifying which ROV is being monitored, or other means of remote identification of an object. If the moving object tracks is an ROV, input is provided from ROV model storage unit 47 indicating the geometry and size of the ROV. P&O unit 21 repeatedly monitors the position, orientation, and type of moving object and provides this information to course projector device 63. Course projector device 63 then extrapolates a course of the moving object and indicates that the locations occupied by the moving object over its projected course in appropriate time/space storage locations in device 61. It is important to properly update time space storage device 61 over predetermined time intervals in order to minimize the storage required. This involves continuously writing over past time periods in a rotating buffer scheme. In order to determine a trajectory from a starting point to a destination point, the course projection of moving objects need only be projected from the time at the starting point of a trajectory to time of the ending point, or a portion thereof.

A control unit 73 interacts with a pointing device 65 operated by an operator 2. Operator 2 may select, as stated above, a starting destination, a finishing destination or may select time/space locations where ROVs may meet to hand-off equipment to cooperatively perform specified tasks. Control unit 73 then looks through time/space storage memory for a course which would not intersect any time/space location occupied by either the stationary objects of the environment or moving objects as projected by course projector device 63. In addition, if the course being planned is not the first course, but a subsequent course, all previous courses should be swept through the time/space storage to indicate locations occupied at different times during the planned trajectories.

As control unit 73 or course projector device 63 sweep through a trajectory, they take into account the geometry and size of the ROV which is being swept and accordingly indicate in time/space storage device 61 all locations occupied by the ROV and not simply a centerpoint.

Control unit 73, in plotting a course, takes input from ROV model storage 47. This allows control unit 73 to take into account space required at different orientation angles of the ROV. This means that the ROV may be turned sideways to slide through obstructions. In addition to clearance needed, a small envelope of additional clearance is added to provide the small margin of error, when calculating the trajectory course.

Control unit 73 may control several different ROVs and therefore each path stored in time/space storage device 61 must be labeled for its corresponding ROV. Control unit 73 may then play back the trajectory to a path execution unit 67 which ultimately runs the actuators of an ROV. In FIG. 2, path execution unit 67 is ultimately operating actuators 13 of ROV 10. However, control unit 73 may, by time slicing, also operate actuators 14 of ROV 20.

In another embodiment, control unit 73 provides trajectory, environment, and course projections to a control unit of another system 100 being similar to that shown in FIG. 1, which may control other ROVs. The relationship between the first and second control units 73, 64 may be that of a "master", "slave" relationship in that the first determines the paths and trajectories and transfers them to the second control unit which merely passes the information on to its own path execution unit.

The ROVs may work cooperatively to perform functions. One ROV may excite a surface with radiation while another receives radiation scattered at a specified angle.

Another such cooperative setup would be to additionally add to the sensor package, mechanical apparatus for grasping objects. The ROVs may work in concert to "hand off" objects at specified (x,y,z,t) coordinates. This may be beneficial in moving objects past the length of a first tether cord, but well within range of a second.

In order to monitor the actual path and the proposed path, a flight path monitoring unit 69 is implemented which receives the actual position and orientation from P&O unit 21 along with the proposed trajectory stored in time/space storage unit 61. Both of these paths may then be displayed on monitor 43 through mixer 41.

Operator 2 may also define destination points by typing symbolic names, or numerical locations into pointing device 65. Operator 2 may determine that the trajectory is acceptable and cause path execution unit 67 to execute the trajectory. Path execution unit 67 drives actuator 13 (FIG. 1) to move the ROV according to the calculated trajectory. Thus, the current calculated trajectory (or one selected from time/space storage device 61) can be executed by the actual ROV within the actual environment upon command by operator 2.

Operator 2 may indicate not only destination points, but intermediate points of the trajectory. Control unit 73 determines a path as near to the points indicated by operator 2 which will not cause a collision.

Since rapid, accurate determination of irregularities is very important in many cases, such as in off-line maintenance of a nuclear power plant, and costs are related to the length of time the plant is off-line, it is important to collect, retrieve and compare image data rapidly. In conventional systems, video image are acquired of suspect sites of a structure. At a later date, the ROV is directed manually to one of the suspect sites. A current video image is acquired, and the images are viewed side-by-side, usually in real-time, to determine the degree of deterioration. The comparisons are only valid when the archived image and the current image have the similar imaging parameters.

The sensor package information from past inspections at a given site are collected, archived, and used for future inspections by A & C device 50, as described in U.S. Pat. No. 5,412,569 May 2, 1995 "Augmented Reality Maintenance System with Archive and Comparison Device" by Nelson R. Corby, Jr., Peter M. Meenan, Claude H. Solanas III, David C. Vickerman, Christopher A. Nafis, assigned to the present assignee and hereby incorporated by reference. A&C device 50 receives input from P&O sensing unit 21, sensor package 11 and operator 2. A&C device 50 provides input to video mixer 41 for display on monitor 43.

Many elements of the block diagram of FIG. 1 may be physically located in the ROV or in the base unit, making little difference where they are located, except that monitor 43 and pointing device 65 must be accessible to operator 2; and actuators 13 and sensor package 11 must be on the ROV.

While several presently preferred embodiments of the present novel invention have been described in detail herein, many modifications and variations will now become apparent to those skilled in the art. It is our intent therefore, to be limited only by the scope of the appending claims and not be the specific details presented by way of explanation herein.

What we claim is:

1. A remote maintenance system for inspection and repair of structures in an environment comprising:
   a) a plurality of remotely operated vehicles (ROVs) each having
      1. a sensor package, for inspecting physical characteristics of said structures in the environment, and
      2. actuators for maneuvering the ROV;
   b) a position and orientation sensing (P&O) unit for providing a position and orientation, of any-moving objects and each of the ROVs;
   c) an environment model storage device for retaining computer graphic information regarding the environment of the ROV;
   d) an environment modeler for receiving parameters defining objects in the environment of the ROV and producing a computer generated model of the environment and storing the model in the environment model storage device;
   e) an ROV model storage device for retaining computer graphic information regarding the ROV size and shape parameters;
   f) an ROV modeler for receiving parameters defining the ROV and producing a computer generated model of the ROV for storing in the ROV model storage device;
   g) an automated flight planner comprised of:
      i. a pointing device allowing the operator to select an ROV and points on a path which the operator desires the selected ROV to follow,
      ii. a time/space storage coupled to the environment model storage device unit for storing information defining locations in space occupied at different times,
      iii. a course projector coupled to the P&O unit and the ROV model storage device for planning a trajectory for each of the moving objects monitored by the P&O unit, and indicating locations in space which are occupied by the moving objects at different times stored in the time/space storage device, and
      iv. a control unit for receiving the shape of each ROV from the ROV model storage device, and sweeping the received shape of each ROV through the associated planned trajectory which indicates the occupied locations at different times stored in the time/space storage device for all planned trajectories, for planning a path based on the operator selected points which will not intersect any occupied locations.

2. The remote maintenance system of claim 1 further comprising a path execution unit coupled to the control unit and actuators, for receiving a selected trajectory from the control unit and causing the actuators to move the ROV along said selected trajectory.

3. The remote maintenance system of claim 1 further comprising a flight path monitoring unit coupled to the P&O unit and the time/space storage unit, for reading a selected trajectory from the time/space storage unit, monitoring the actual location and position of a selected ROV over time, indicating the selected ROV's actual path and displaying the selected trajectory and the actual path of the selected ROV.

* * * * *